United States Patent [19]

Nishihara

[11] Patent Number: 5,764,637
[45] Date of Patent: Jun. 9, 1998

[54] STM/ATM CONVERTER

[75] Inventor: Motoo Nishihara, Tokyo, Japan

[73] Assignee: NEC Corporation, Tokyo, Japan

[21] Appl. No.: 647,040

[22] Filed: May 9, 1996

[30] Foreign Application Priority Data

May 9, 1995 [JP] Japan ................................ 7-110582

[51] Int. Cl.[6] ................................................ H04L 12/56
[52] U.S. Cl. ........................ 370/397; 370/412; 370/474; 370/466
[58] Field of Search ................................. 370/352, 354, 370/356, 471–474, 420, 476, 389, 395, 397–399, 412, 375, 376, 466, 467

[56] References Cited

U.S. PATENT DOCUMENTS

| | | | |
|---|---|---|---|
| 5,274,635 | 12/1993 | Rahman et al. | 370/352 |
| 5,287,348 | 2/1994 | Schmidt et al. | 370/352 |
| 5,428,609 | 6/1995 | Eng et al. | 370/392 |
| 5,483,527 | 1/1996 | Doshi et al. | 370/399 |
| 5,577,037 | 11/1996 | Takatori et al. | 370/411 |
| 5,619,500 | 4/1997 | Hiekali | 370/396 |
| 5,623,491 | 4/1997 | Skoog | 370/404 |

*Primary Examiner*—Chau Nguyen
*Attorney, Agent, or Firm*—Foley & Lardner

[57] ABSTRACT

An STM/ATM converter for converting time-slot data in STM frames to ATM cells, which allows channel assignment on the STM transmission line to be flexible. In a writing operation for assembling the ATM cell, each byte data of STM frame arriving is written into a selected idle cell block which is the same size of memory capacity as an ATM cell. In a reading operation for cell output, a virtual path identifier VPI number in the FIFO 104 is read out, and in turn, the address of a cell block stored in a read address FIFO 205 corresponding to the VPI number is read out. Contends of the cell block are read out and added with overhead information for outputting as the ATM cell.

3 Claims, 6 Drawing Sheets

STM/ATM CONVERTER

BACKGROUND OF THE INVENTION

1. Field of the Invention

Present invention relates to an STM/ATM converter for converting multiplexed STM (Synchronous Transfer Mode) signal to an ATM (Asynchronous Transfer Mode) signal, in which each channel of time-division multipled signal in each time slot of the periodic frames of the STM signal is converted to an ATM cell having a virtual path identifier (in the attached figures, referred to as VPC) specified by any one of VPI (Virtual Path Identifier) or VCI (Virtual Connection Identifier) or both VPI and VCI for each channel.

2. Description of the Related Art

In general in the STM transmission line, the STM signal is time-division multiplexed in the form of a time slot comprising eight bits in a certain frame period of 125 μs or 500 μs. A channel is assigned to the time slots at the same positions periodically corresponding to the frame period. For example, in the case of the frame period of 125 μs, one time slot corresponds to a data transmission speed of 64 kbps.

Viewing from the point of the frame synchronization established on the STM, the STM transmission line used, such as SDH (Synchronous Digital Hierarchy) or N-ISDN (Narrow-band Integrated Services Digital Network), is structured by periodical assignment of time slots, and the channel having a data transmission speed of 64 kbps×n (n represents a natural number) is accommodated by assigning a plurality of time slots to form one channel in a same frame period.

On the other hand, a plurality of data cells (ATM cells) of 53 bytes (5 bytes of header and 48 bytes payload) flow on the ATM transmission line. Destination of each ATM cell flow on the ATM transmission line is discriminated by virtual path identifier attached to each ATM cell.

In the STM/ATM conversion, each of a plurality of STM channels on the STM transmission line is assigned to corresponding virtual route identifier and is converted to the ATM cell having the virtual route identifier, and outputted.

In the use of cell buffer in conventional conversion method, predetermined restriction is given to the time slot on the STM transmission line and a pre-setting block area corresponding to the restriction is assigned in advance to a cell buffer, and reading ATM cell from the cell buffer in a predetermined order. Each block is fixed in size and there is restriction in combination of transmission speed of STM assigned to each virtual path, and the reading operation is fixed order as shown in FIG. 1.

On the other hand, another conventional conversion method in which ATM cell reading is operated, as shown in FIG. 2, in accordance with queueing state of ATM cells in the cell buffer is also used, but block area divided for each virtual route identifier is still in pre-setting condition. Therefore, re-setting and reallocation of block areas in the cell buffer by a certain algorithm is required every time when time-division state on the STM is changed.

In the former case of conventional method (shown in FIG. 1), difficulties arise in channel allocation of 64 kbps×n without restriction on the STM transmission line due to the cell buffer which is block-divided in a fixed manner, and also adequate cell reading order must be found to fit the speed ratio of a plurality of channels on the STM transmission line.

For example, it is assumed that all blocks of the cell buffer are same in size, transmission speed of all VP, which is other than VP=0, is 1V, and transmission speed of VP of VP=0 is 1000 V. It is also assumed that some amount of data which is approximately enough for assembling one cell has been accumulated in many channels excepting VP=0 and then the data are assembled to cell at a time, and sometime later the channel of VP=0 is assembled to cell.

If the priority is given to the channel whose cell has assembled earlier in time, cells for (n−1) channels must be outputted before assembling cell of the channel for VP=0. At this time, cell buffer of the channel for VP=0 over-flows easily because data of the channel for VP=0 accumulated at a speed of 1000 times faster than that of other channels. To prevent the over-flowing, cells are to be outputted in the order of ratio of transmission speed of each channel, namely 1000:1:1:1:1 . . . , and it is required to generate cells in the constant interval between each channels instead of outputting cells in the order of time of cell assembly.

However, it is difficult to determine the order of cell output automatically when various transmission speeds, not only two types, are combined for channels of VP=0 to n, and also execution of the control itself is not easy.

In the latter case of conventional method, the means to find reading order of cells is not automated, and even if it is automated, the flexibility in channel accommodation on the STM transmission line is restricted.

When the cell buffer is to be divided to blocks to improve the flexibility of channel accommodation, large capacity of memory is required for the cell buffer which causes increased circuit size and power consumption because consideration of block size for safety, namely prevention of buffer over-flowing, is necessary due to semi-fixed property of the blocking.

SUMMARY OF THE INVENTION

The present invention solves the problems mentioned hereinbefore by realizing the architecture which operates to automatically assign any channel on the STM transmission line, whereby the architecture has the theoretically minimized cell buffer capacity and minimized circuit size and power consumption.

An STM/ATM converter according to the present invention for converting time-division multiplexed STM frames to ATM cells comprises the following components:

(1) a virtual path identifier discrimination section which receives a byte data on each time slot position in an STM frame, and discriminates and outputting corresponding virtual path identifier number of an ATM cell to be converted;

(2) shared buffer type cell buffer memory means which includes a plurality of cell buffer queues and each cell buffer queue corresponds to each of virtual path identifiers respectivly. The byte data of the STM frame is stored in the cell buffer queue in accordance with the virtual path identifier number outputted from the virtual path identifier discrimination section and an ATM cell is assembled in the cell buffer queue. The queue length information indicating number of ATM cells accumulated in each cell buffer queue is also outputted;

(3) a cell assemble judging section which judges increase of ATM cells having been assembled in each cell buffer queue by the queue length information, and outputs virtual path identifier number corresponding to the cell buffer queue for which increase of ATM cells being judged;

(4) a first-in-first-out type memory queue which stores the virtual path identifier number outputted from the cell assemble judging section;

3

(5) ATM cell reading means which reads an ATM cell from the cell buffer queue corresponding to the virtual path identifier number having been read out from the first-in-first-out type memory queue; and (6) ATM overhead adding means which adds overhead of AAL layer and overhead of ATM layer to the ATM cell read out by the ATM cell reading means, and the ATM cell is outputted.

The shared buffer type cell buffer memory means further comprises the following components:

(1) a plurality of cell blocks, each cell block has the same size of memory area as an ATM cell. In this cell block a pluraility of byte data of STM frames are stored and an ATM cell is assembled;

(2) an idle address first-in-first-out queue which stores addresses of idle cell blocks;

(3) a plurality of read address first-in-first-out queues which correspond to virtual path identifiers, and stores each address of cell blocks which have been assembled into ATM cells;

(4) a writing address table which maintains correspondence table between a virtual path identifier and an address of cell block used for writing operation;

(5) a reading address table which maintains correspondence table between a virtual path identifier and an address of cell block used for reading operation; and (6) queue control means which controls writing operation by indicating each writing address in a cell block, with reference to the writing address table, and writes a cell block address into a read address first-in-first-out queue corresponding to a virtual path identifier of the cell block in which an ATM cell has been assembled, and outputs the queue length information, and also controls reading operation of ATM cell from a cell block by indicating each reading address of the cell block, with reference to said reading address table.

The writing address table and the reading address table further comprises first offset address counting means and second offset address counting means respectivly.

The first offset address counting means provides first offset addresses, each value of the first offset address is incremented by one for every outputting, to indicate each writing address in the cell block, and resetting value of the first offset address to 0 when the value has been reached to a number equals to a length of ATM cell to be assembled.

The second offset address counting means provides second offset addresses, each value of the second offset address is incremented by one for every outputting, to indicate each reading address in the cell block from which an ATM cell being read, and resetting value of the secong offset address to 0 when the value has been reached to a number equals to a length of ATM cell to be read out.

DETAILED DESCRIPTION OF THE PREFERRED EMBODIMENTS

Figure 1:
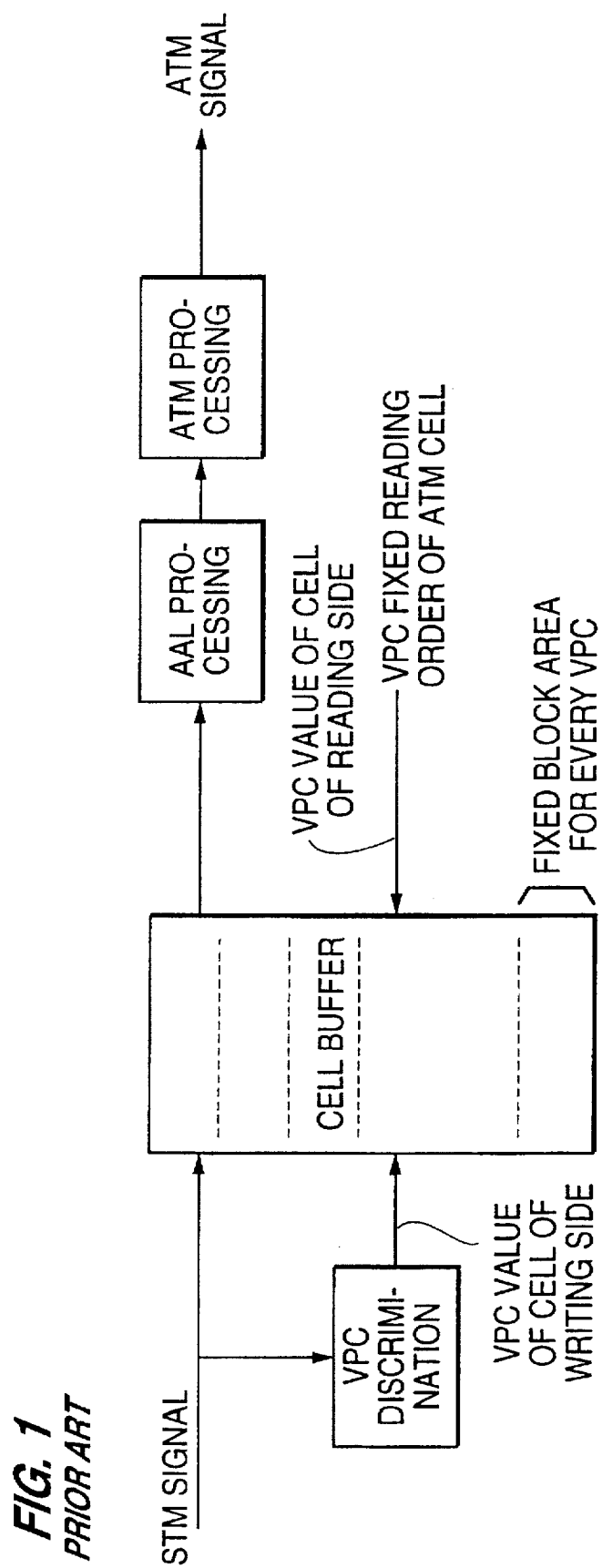
FIG. 1 is a block diagram for illustrating an example of conventional STM/ATM converter.
Figure 2:
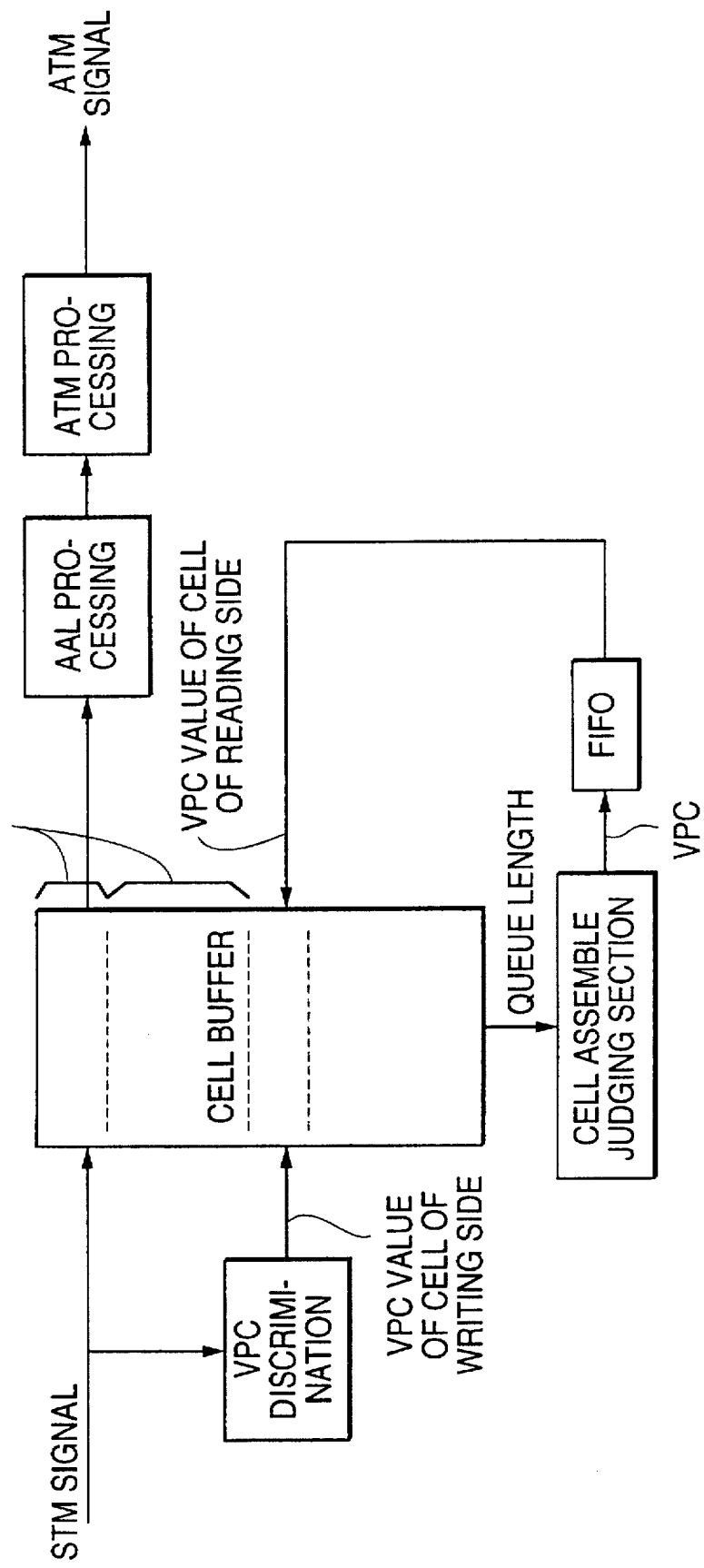
FIG. 2 is a block diagram for illustrating another example of conventional STM/ATM converter.
Figure 3:
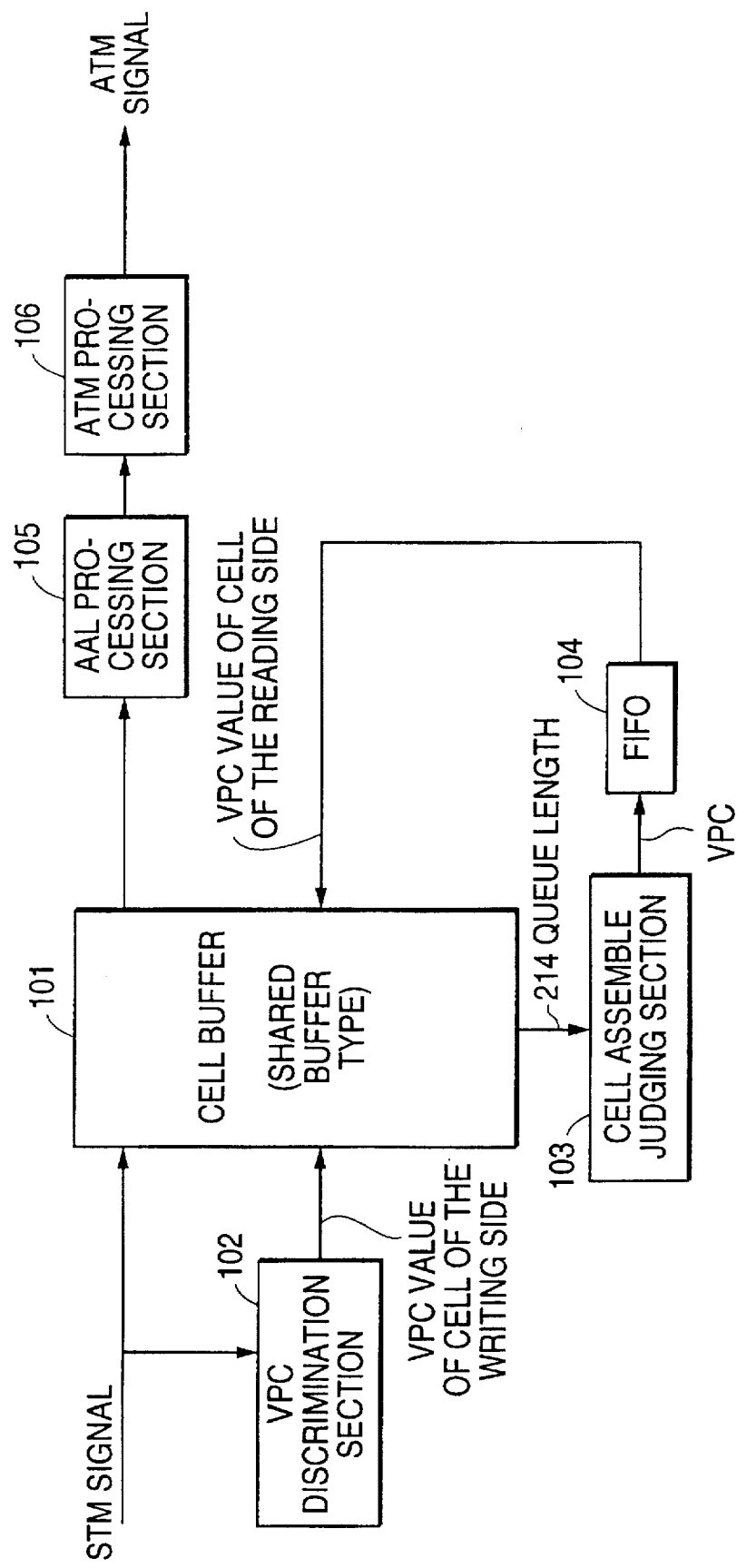
FIG. 3 is a block diagram for illustrating the general architecture of STM/ATM converter of the present invention.

FIG. 3 is a block diagram for illustrating the architecture of STM/ATM converter of one embodiment of the present invention, the STM/ATM converter comprises shared buffer-type cell buffer 101, virtual path identifier (VPC) discrimination section 102, FIFO (first-in first-out buffer) 104, AAL processing section 105, and ATM processing section 106. The cell buffer 101 is a buffer comprising blocks, each of which is called a cell block having a cell size.

Figure 4:
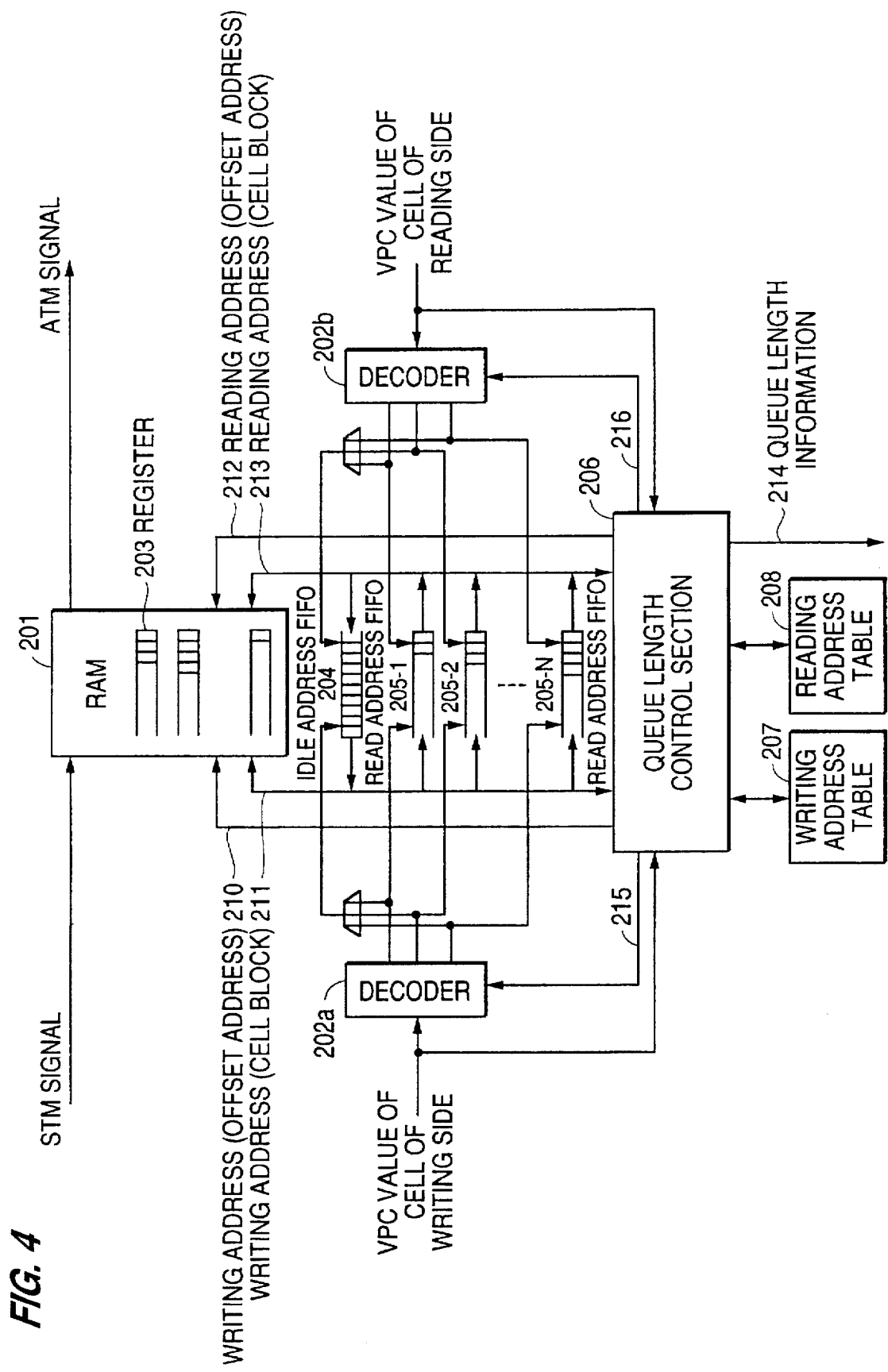
FIG. 4 is a block diagram for illustrating the structure in the cell buffer of the present invention.

FIG. 4 is a block diagram for illustrating the internal structure of the cell buffer shown in FIG. 3, and the cell buffer comprises RAM 201, an idle address FIFO 204 which stores idle cell block addresses in RAM 201, FIFO 205-1 to 205-N for read address for each virtual path identifier which stores cell block addresses of ATM cells having been assembled, queue length control section 206, a writing address table 207 for storing cell block addresses for assembling ATM cell (writing STM data in a cell) and offset address in the cell block, and a reading address table 208 for storing offset address in the cell block to be read out as the ATM cell.

In FIG. 4, the numeral 203 represents a register for storing queue of each virtual path identifier, the numeral 210 represents information of a writing address (offset address) in the cell block, the numeral 211 represents information of a writing address for representing the cell block in RAM 201, the numeral 212 represents information of a reading address (offset address) in the cell block, the numeral 213 represents information of a reading address for representing the cell block in RAM 201, and the numeral 214 is information of queue length of each virtual path identifier.

In FIG. 3, when a byte data of STM signal (STM data) on a time slot position in a frame period of STM signal is delivered as an input to the virtual path identifier discrimination section 102, the virtual path identifier discrimination section 102 refers to an internal table showing the correspondence between the virtual path identifier and the STM data on the time slot position on the STM signal, and generates virtual path identifier data corresponding to the STM data as an output. The cell buffer 101 is a buffer comprising a plurality of blocks for assembling ATM cell from STM data, and each of blocks is a cell size. The ATM cell is assembled by writing STM data (a byte data) in each cell block, during writing operation of STM data.

The writing position in a cell block for writing STM data is stored in the writing address table 207 shown in FIG. 4, the address of writing position is added one by one for each writing, and when the writing position is counted up to the cell length, it means that one ATM cell has been assembled and a new cell block is assigned for next ATM cell assembly.

When writing, the cell assemble judging section 103 in FIG. 3 judges whether new ATM cell has been assembled by comparing with the number of cells. The cell assemble judging section 103 judges as increase of assembled ATM cell when, for example, a cell buffer increases from [A cell+x bytes] to [(A+1) cell]. When it judges ATM cell increase, the virtual path identifier corresponding to the new ATM cell is written into the FIFO 104.

The ATM cell is read out from the cell buffer 101 in accordance with the information of virtual path identifier written in FIFO 104. The ATM cell having been read out is added with ATM overhead through AAL processing section 105 and ATM processing section 106, and is outputted.

The same size as the number of channels (N channels) assigned to the STM signal is enough for the size of FIFO 104 to be provided. The minimum size of the cell buffer is a size corresponding to (2N+1) cells.

The reason is described herein under.

It is assumed that the value of $t_i$ represents a period of time of STM data in each channel is coming into, and an observation starts at a time of t=0 and then the time t increases by one for each input of STM data. The number of ATM cells to be assembled for each channel after the time of t is represented by a step function, and the upper limit is represented by the formula 1.

Formula 1: $y_i = t/t_i + a_i (0 \leq a_i < 1)$

The interface of ATM cell reading is assumed to be a full ATM interface on which ATM cells and other layers are laid without overhead.

In this formula 1, the condition of $(0 \leq a_i < 1)$ is caused by that STM data can be accumulated in a range not exceeding one ATM cell at the time of t=0. Therefore, number of ATM cells assembled in all channels falls on the plot of the following formula, wherein N represents the number of channels.

Formula 2: $Y_I = \sum_{i=1}^{N} y_i = \left( \sum_{i=1}^{N} 1/t_i \right) t + \sum_{i=1}^{N} a_i$ Assuming that STM signal is all stored in the cell buffer, the number of ATM cells read out from the cell buffer after the time of t=0 is represented by a step function, and the lower limit is represented by the following formula 3.

Formula 3: $Y_0 = t/54 + a_0 (a_0 < 0)$

That is, STM data is written into a cell block by each byte data basis. The writing address table 207 contains a cell block address which is now being written for each virtual path and the offset address in the cell block. When writing STM data into a cell block for a certain virtual path starts for cell assembly, the writing address table 207 is referred with the virtual path identifier number and the writing address 211 (cell block address corresponding to the virtual path) and the offset address in the cell block 210 are given to RAM (the cell buffer) 201. At this time, the queue length control section 206 instructs the writing address table 207 to increment the value by one for updating offset address value in the table 207. The queue length control section 206 writes the cell block address to the FIFO 205 corresponding to the virtual path when the offset address value having been incremented reached to the predetermined value, for example, 48 bytes (equals to the size of ATM cell payload segment).

It means that the offset address counts up between zero to a predetermined value, for example 47=48−1, and is reset to zero. When the next STM data is inputted, an idle cell block address is read from a idle address FIFO 204, the writing address table 207 is updated, and the offset address of the table is cleared to zero.

When the offset address in the cell block is reached to the predetermined value as the result of writing of STM data, it means that an ATM cell has been assembled, and the cell block address is written in the reading cell block address FIFO 205 corresponding to the virtual path, and simultaneously, the virtual path value itself is written in the FIFO 104.

For reading ATM cell assembled in the cell buffer by the writing operation, first of all, the FIFO 104 is read out and then the virtual path identifier of the ATM cell to be read out is discriminated. A concrete cell block address of RAM (cell buffer) 201 is specified by the output of the reading cell block address FIFO 205 corresponding to the virtual path identifier read out from the FIFO 104, and also the offset address in the cell block is specified from the reading address table 208, and payload segment of the ATM cell having been assembled in the cell buffer is read out.

When the reading of the cell block is completed, the reading position of the reading cell block address FIFO 205 is set to the next address position of cell block, and also the reading address table 208 reset the offset address.

The ATM cell having been read out is added with ATM overhead information through AAL processing section 105 and ATM processing section 106 shown in FIG. 3, and is outputted.

Figure 5:
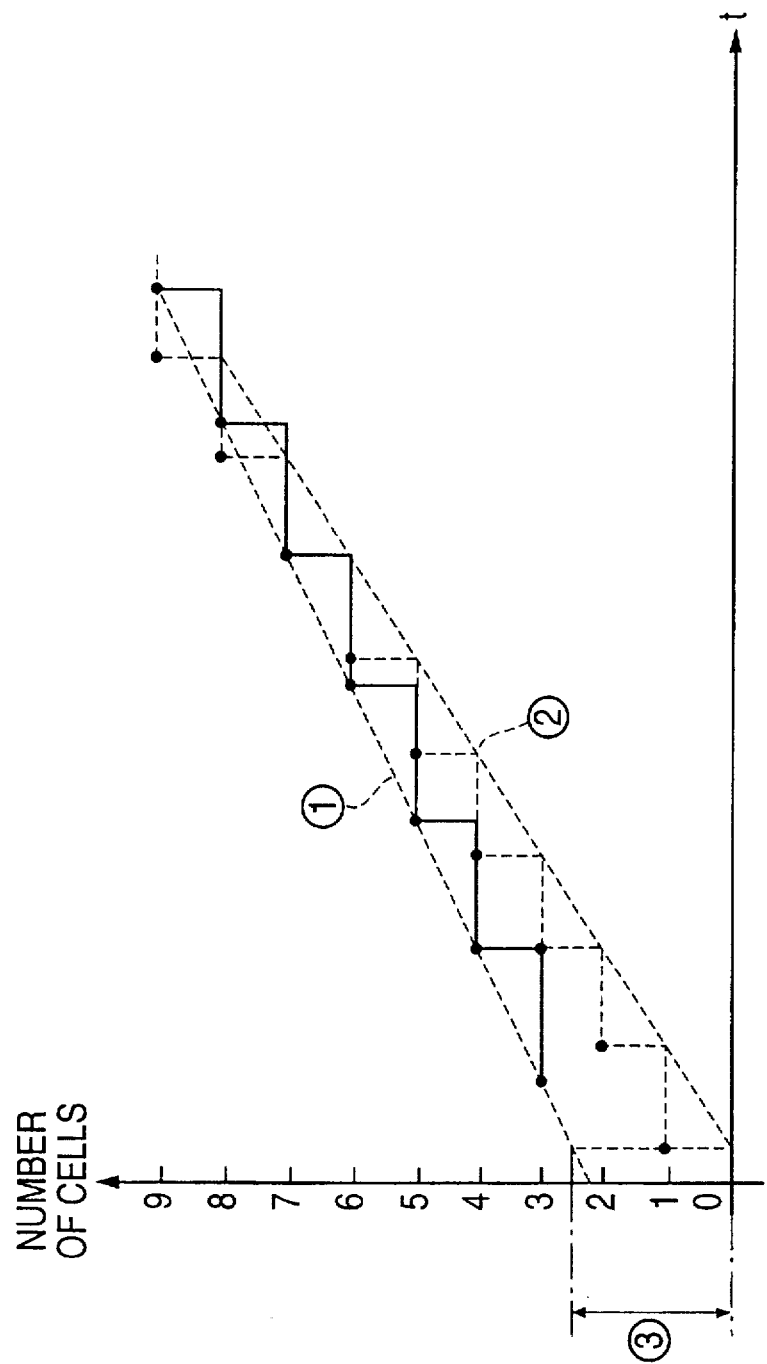
FIG. 5 is a a graph for describing the relationship between the number of cells assembled in the writing operation and the number of cells read out in the reading operation in the cell buffer model.
Figure 6:
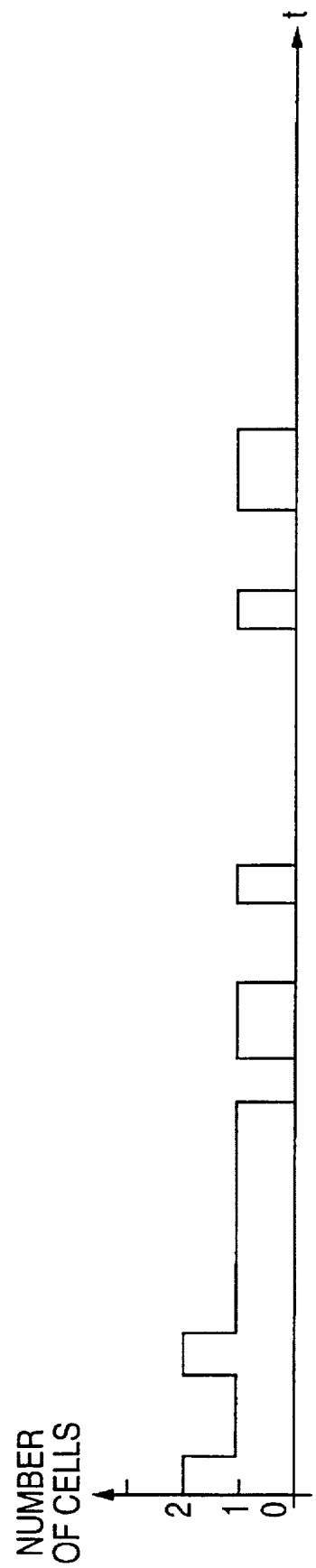
FIG. 6 is a graph for describing the change in the number of cells in the cell buffer in correspondence with the model shown in FIG. 5.

If the speed of cell reading is faster than cell writing, the buffer will become vacant after in a certain time period even if so many cells are accumulated in the buffer. Referring to FIG. 5, based on the difference between the upper limit line of the step function which represents the number of reading cells and lower limit line of the step function which represents the number of writing cells, the number of cell accumulated in the buffer can be estimated. In this case, the size of the buffer is assumed to be infinite. In the figure, the numeral 1 in a circle represents the number of writing cells according to the formula 2, and the numeral 2 in a circle represents the number of reading cells according to the formula 3. In FIG. 6, the number of cells in the buffer is shown.

Under the condition described herein above, the number of cells in a buffer decreases absolutely to zero after a certain period of time. Here, the possible maximum number of cells accumulated in a buffer is represented by the subtraction of the number of output cells plotted by the formula 3 from the number of input cells plotted by the formula 2. The maximum difference is the value represented by the numeral 3 in a circle in FIG. 5. The maximum difference is obtained by substituting a t-value at the intersection of the formula 3 and t-axis to the formula 2.

In FIG. 6, obviously cells exist in the cell buffer initially. In the output, cells are read out in the period of cell length (if a cell does not exist in the cell buffer, idle cells are read out), therefore, 1<53. As it is assumed that the speed of cell input (i.e. cell assenbly) is slower than cell output speed, the following relationship is obtained.

$$\sum_{i=1}^{N} (1/t_i) < (1/53).$$

Therefore, ③ in FIG. 5 is represented by the following formula 4.

Formula 4:
$$Y_i(1) = \sum_{i=1}^{N} a_i + \left( \sum_{i=1}^{N} 1/t \right) \times 1$$
$$< \sum_{i=1}^{N} a_i + \left( \sum_{i=1}^{N} 1/t \right) \times 53$$
$$< \sum_{i=1}^{N} a_i + 1$$
$$< N + 1$$

From the above mentioned description, it is found that the number of cells equal to the maximum number of channels (N) exists in the cell buffer, and a cell block currently being assembled to ATM cell also exits for each channel.

Accordingly, the entire capacity of the cell buffer is represented by the following formula 5.

Formula-5: cell number (number of cells)=N+N=2N

Herein, the period of ATM cell assembly by STM data is assumed as constant, but when STM data is inputted in a burst mode, it is still possible to estimate the safe side by substituting the peak speed of ATM cell assembly to the above mentioned 1/$t_i$ parameter.

Next, the operation as shared buffer in a cell buffer is described.

RAM 201 in FIG. 4 comprises a plurality of blocks and the size of each block is the size of a cell. In RAM 201, queues in the number which is equal to the total number of virtual path identifiers (=total number of channels=N) corresponding to each virtual path identifier exist. The arrangement of cell numbers in each queue is random.

For the arrangement of queues, it is possible to manage cell block address for each virtual path identifier in the form of FIFO. This FIFO is represented by numerals 205-1 to 205-N, which is for reading address of cell block in RAM 201.

The head cell of the queue of the virtual path identifier is read out from RAM 201 based on the cell block address read from FIFO 205. The cell block address which has been read out becomes idle state, and is written into FIFO 204 which manages addresses in the form of idle address list after cells has been read out. Writing into RAM is byte data basis, therefore, the writing address in RAM 201 is represented by the cell block address 211 and offset address information 210 in the cell block under writing for each virtual path identifier.

FIFO 205 is provided for each virtual path. Therefore, the virtual path identifier from the virtual path identifier discrimination section 102 is judged by decoding in the queue length control section 206. The cell buffer comprises a plurality of cell blocks arranged in a matrix form, and the position of a cell block is specified by cell block address.

When new byte data (STM data) corresponding to the virtual path identifier is inputted, the offset address value is incremented by one, and it is stored as new offset address information in the writing address table 207. If the offset address coincides with the cell size, the decoder 202a is rendered enable by an enable signal 215, thereby, generation and storage of the new cell block address is started.

Naturally, many STM channels are multiplexed in the input side. The virtual path identifier discrimination section 102 in FIG. 3 discriminates the virtual path identifier and corresponding STM channel data based on the time information, and provides the virtual path identifier to the cell buffer 101.

In the reading operation, the offset address information 212 is stored for each virtual path identifier, and when reading, the offset address information is incremented by one. After completion of reading of one cell block, a new cell block address is read out from FIFO 205 as the reading address of the virtual path, and the offset address of the reading address table 208 is reset to zero.

The queue length control section 206 controls the queue length of each virtual path identifier, and writes a specified value, for example, 48 bytes to a cell block under writing in each virtual path, afterwards, writes the cell block address to reading address FIFO 205 corresponding to the virtual path, reads a cell block address to be used from the idle address FIFO 204 to update the writing address table 207, and also the offset address of the writing address table 207 is reset to zero. Simultaneously, the virtual path identifier is written.

These processes are performed to the idle address FIFO 204, reading address FIFO 205 for each virtual path identifier, and writing address tables 207 and reading address table 208 by the queue length control section 206, current queue length is delivered to FIFO 104 and used to determine the ATM cell reading order in the ATM cell reading operation.

As described hereinbefore, according to the present invention, the cell buffer size can be minimized, and the STM/ATM conversion in any combinations of STM data speeds can be performed automatically.

In the present invention, shared memory type buffer is used for cell block unit as cell buffer, when one ATM cell is assembled and added in the queue, the virtual path identifier corresponding to the ATM cell is stored in FIFO 104, and it is used in FCFS (first come, first serve) condition as a virtual path identifier for reading cell. The depth (i.e. capacity of buffer memory) of FIFO 104 of the number equivalent to all number of channels (N) is enough to realize FCFS condition, and the depth of cell buffer of 2N is enough in the present invention. Although FIFO for controlling queues in cell buffers of shared buffer is extra hard ware, the overall memory is smaller than other conventional methods, considering the increase of cell buffer in integral multiple of a cell length. The smaller memory leads to reduced circuit size and power consumption of the hard ware structure.

STM channels can be assigned freely in time slot combination only under the restriction that the total number of channels does not exceed N, and can be set to the speed of 64 kbps×n. Information only required for the operation of the present invention is the table (virtual path identifier discrimination section 102) for discriminating correspondences between time slot of STM signal and virtual path identifier of ATM signal, and other processings such as ordering of ATM cell reading and storage in cell buffers are operated automatically in the architecture.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An STM/ATM converter for converting time-division multiplexed STM frames to ATM cells, said STM/ATM converter comprising:

a virtual path identifier discrimination section for receiving a byte data on each time slot position in an STM frame, and discriminating and outputting corresponding virtual path identifier number of an ATM cell to be converted;

shared buffer type cell buffer memory means for providing a plurality of cell buffer queues each corresponding to each of virtual path identifiers respectively, a plurality of cell blocks each used for storing said byte data of the STM frame and assembling an ATM cell, and a plurality of address queues each corresponding to each virtual path identifiers respectively, for putting a cell block having been assembled to an ATM cell and an address of said cell block into a corresponding cell buffer queue and a corresponding address queue respectively in accordance with said virtual path identifier number outputted by said virtual path identifier discrimination section, and for outputting queue length information indicating number of ATM cells accumulated in each cell buffer queue;

a cell assemble judging section for judging increase of ATM cells having been assembled in each cell buffer queue by said queue length information, and outputting virtual path identifier number corresponding to the cell buffer queue for which increase of ATM cells being judged;

a first-in-first-out type memory queue for storing said virtual path identifier number outputted from said cell assemble judging section;

ATM cell reading means for reading out the virtual path identifier number being stored in said first-in-first-out type memory queue, for reading out the address being stored in said address queue corresponding to the virtual path identifier number having been read out, and for reading out an ATM cell, locating in the address having been read out, from said cell buffer queue corresponding to the virtual path identifier; and ATM overhead adding means for adding overhead of AAL layer and overhead of ATM layer to the ATM cell read out by said ATM cell reading means for outputting.

2. An STM/ATM converter for converting time-division multiplexed STM frames to ATM cells, said STM/ATM converter comprising:

a virtual path identifier discrimination section for receiving a byte data on each time slot position in an STM frame, and discriminating and outputting corresponding virtual path identifier number of an ATM cell to be converted;

shared buffer type cell buffer memory means for providing a plurality of cell buffer queues each corresponding to each of virtual path identifiers respectively, a plurality of cell blocks each used for storing said byte data of the STM frame and assembling an ATM cell, and a plurality of address queues each corresponding to each virtual path identifiers respectively, for putting a cell block having been assembled to an ATM cell and an address of said cell block into a corresponding cell buffer queue and a corresponding address queue respectively in accordance with said virtual path identifier number outputted by said virtual path identifier discrimination section, and for outputting queue length information indicating number of ATM cells accumulated in each cell buffer queue;

a cell assemble judging section for judging increase of ATM cells having been assembled in each cell buffer queue by said queue length information, and outputting virtual path identifier number corresponding to the cell buffer queue for which increase of ATM cells being judged;

a first-in-first-out type memory queue for storing said virtual path identifier number outputted from said cell assemble judging section;

ATM cell reading means for reading out the virtual path identifier number being stored in said first-in-first-out type memory queue, for reading out the address being stored in said address queue corresponding to the virtual path identifier number having been read out, and for reading out an ATM cell, locating in the address having been read out, from said cell buffer queue corresponding to the virtual path identifier; and ATM overhead adding means for adding overhead of AAL layer and overhead of ATM layer to the ATM cell read out by said ATM cell reading means for outputting, wherein said shared buffer type cell buffer memory means further comprises:

a plurality of cell blocks, each having the same size of memory area as an ATM cell, for storing and assembling a plurality of byte data of STM frames into an ATM cell;

an idle address first-in-first-out queue for storing addresses of idle cell blocks;

a plurality of read address first-in-first-out queues, each corresponding to each of virtual path identifiers respectively, for storing each address of cell blocks having been assembled in ATM cells;

a writing address table for maintaining correspondence table between a virtual path identifier and an address of cell block in which a plurality of byte data of STM frames are to be written;

a reading address table for maintaining correspondence table between a virtual path identifier and an address of cell block from which an assembled ATM cell is to be read out; and queue control means for controlling writing operation by indicating each address of a cell block, with reference to said writing address table, in which a plurality of byte data of STM frames are to be written, writing a cell block address into a read address first-in-first-out queue corresponding to a virtual path identifier of the cell block in which an ATM cell being assembled, and outputting said queue length information, and for controlling reading operation of ATM cell being assembled by indicating each address of a cell block, with reference to said reading address table, in which an assembled ATM cell being contained.

3. The STM/ATM converter according to claim 2, wherein said writing address table and said reading address tables, respectively, further comprising:

first offset address counting means for providing first offset addresses, each value of said first offset address being incremented by one for every outputting said first offset address, to indicate each address in said cell block in which a plurality of byte data of STM frames are to be written, and resetting value of said first offset address to 0 when said value being reached to a number equals to length of ATM cell to be assembled; and second offset address counting means for providing second offset addresses, each value of said second offset address being incremented by one for every outputting second offset address, to indicate each address in said cell block from which an ATM cell being read, and resetting value of said second offset address to 0 when said value being reached to a number equals to a length of ATM cell to be read out.

* * * * *